United States Patent
Lo et al.

(10) Patent No.: US 6,247,082 B1
(45) Date of Patent: Jun. 12, 2001

(54) METHOD AND CIRCUIT FOR PROVIDING HANDSHAKING TO TRANSACT INFORMATION ACROSS MULTIPLE CLOCK DOMAINS

(75) Inventors: Burton B. Lo, San Francisco; Anthony L. Pan, Freemont, both of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/186,209

(22) Filed: Nov. 3, 1998

(51) Int. Cl.$^7$ .................................................. G06F 1/00
(52) U.S. Cl. ............................................................ 710/105
(58) Field of Search ................................ 710/105, 52, 66, 710/127

(56) References Cited

U.S. PATENT DOCUMENTS

| | | | |
|---|---|---|---|
| 3,623,010 | * 11/1971 | Burkhalter | 710/46 |
| 4,245,299 | * 1/1981 | Woods et al. . | |
| 4,727,370 | * 2/1988 | Shih | 340/825.1 |
| 4,882,704 | * 11/1989 | Komori et al. | 710/105 |
| 4,999,769 | * 3/1991 | Costes et al. . | |
| 5,014,186 | * 5/1991 | Chisholm | 710/30 |
| 5,444,860 | * 8/1995 | Datwyler et al. | 710/52 |
| 5,787,263 | * 7/1998 | Tamagawa et al. | 710/107 |

OTHER PUBLICATIONS

Rosenberg, Dictionary of Computers Information Processing & Telecommunications, 1987, p. 68.*

* cited by examiner

*Primary Examiner*—Paul R. Myers
(74) *Attorney, Agent, or Firm*—Wagner, Murabito & Hao LLP

(57) ABSTRACT

A method and circuit for handshaking information across multiple clock domains within an electronic system. The environment of the present invention includes an electronic or computerized system having at least two subsystem domains (a first domain and a second domain) operating at different clock rates (a first clock and a second clock). The present invention includes a handshake circuit coupled between the first and second domains for providing the required handshaking signals to control the transfer of data between the first domain (master) and the second domain (slave). An information bus is coupled between the domains. The handshake circuit is such that double synchronization is not required and the design of the present invention is dynamic such that it is operable between clock domains of varying frequency. The present invention utilizes the asynchronous input of a flip-flop circuit to catch the pertinent handshaking signals between clock domains. The D input and the clock input of the flip-flop circuit are coupled to the master clock domain and the master clock domain receives a ready signal back. When ready is asserted, the master domain may assert a request (from the master domain) over the D input and hold data. The Q output is coupled to a request (to the slave domain) which is also coupled as an input to a NOR circuit. An acknowledge signal is coupled to the asynchronous flip-flip input as a clear and also coupled to the second input of the NOR circuit. The output of the NOR circuit generates the ready signal.

20 Claims, 6 Drawing Sheets

METHOD AND CIRCUIT FOR PROVIDING HANDSHAKING TO TRANSACT INFORMATION ACROSS MULTIPLE CLOCK DOMAINS

BACKGROUND OF THE INVENTION

1. Field of the Invention

The present invention relates to the field of digital electronic systems. More particularly, the present invention relates to the field of interface circuits used for the communication of information between two or more electronic domains or subsystems having different clock rates.

2. Related Art

Designs of computer systems and computer system architectures today can include the combination of one or more different subsystems with each subsystem having a different bus architecture. Subsystems are combined to facilitate the implementation of larger systems and typically known and standard subsystems are the ones selected for combining. By using known and standard subsystems, design time, manufacturing costs, design complexity, system maintenance and trouble shooting can all be reduced advantageously.

One standard bus architecture is the Peripheral Component Interconnect (PCI) bus standard. Computer systems can communicate with coupled peripherals using different bus standards including the PCI bus standard, or alternatively, using the Industry Standard Architecture (ISA) and Extended Industry Standard Architecture (EISA) bus standards. Recently, the IEEE 1394 serial communication standard has become a popular bus standard adopted by manufacturers of computer systems and peripheral components for its high speed and interconnection flexibilities. Each of the above communication standards communicates information (e.g., in data packets) at particular clock rates depending on the clock speed selected for the bus architecture.

Interconnected subsystems of an integrated circuit design do not necessarily communicate or operate at the same clock frequency. Due to the many bus architecture standards available within computer systems and communication systems, it is often the case that one computer (or device) of one bus standard or "clock domain" is coupled to and communicates with another computer (or device) of another bus standard having another different clock domain. Since the clock frequencies of these bus standards are not necessarily compatible, bridge circuits or "interface circuits" have been used in the prior art to generate special handshaking signals, or otherwise function, to allow communication from one clock domain to another. The interface circuit is physically coupled between the two clock domains and is thereby made available to receive and send data or control information between the clock domains.

There are several different types of interface circuits in the prior art. One type of interface circuit includes a dual ported memory unit (e.g., random access memory) that allows one clock domain to write data into the memory and then allows the other clock domain to read the data from the memory. However, a disadvantage of this solution is that it is very costly in terms of circuit complexity and integrated circuit size. In many applications, these interface circuits are not practical from cost or substrate area standpoints. Another solution introduces a first-in-first-out (FIFO) memory element into the interface circuit for receiving (at one end) information from one clock domain and sending (at the other end) the information to the other clock domain. This solution is disadvantageous because it introduces unwanted latency in the transfer of information from one clock domain to another. The latency typically increases linearly with the size of the FIFO memory unit.

FIG. 1A illustrates another interface circuit for providing handshaking signals between clock domains (domain 1 and domain 2). In this example case, domain 2 is operating at a clock speed faster than domain 1. Specifically, FIG. 1A illustrates circuitry for sending a request signal from domain 1 to domain 2 and FIG. 1B illustrates the circuitry for sending a corresponding acknowledge signal from domain 2 back to domain 1. Flip-flop circuit 10 is clocked by the clock signal of domain 1 over clock line 14. Flip-flop circuits 20 and 30 are both clocked by domain 2 having a second (and different) clock frequency which is applied at clock line 40. Dashed divider 25 divides the domains. A request signal from domain 1 is fed over line 12 to the data input of flip-flop circuit 10 and the request signal ("RQ") is asserted by the output of flip-flip 10 over line 16. Line 16 is coupled to the data input of flip-flip 20 which is coupled to flip-flop 30 in a double synchronization configuration 45. The request signal is then obtained by domain 2 at the output of flip-flop 30 over line 42. This interface circuit is disadvantageous because the double synchronizer circuit 45 adds unwanted delay in the communication of the request signal from domain 1 to domain 2 and thereby introduces an unwanted performance hit.

FIG. 1B illustrates the circuitry for sending a corresponding acknowledge signal ("AQ") from domain 2 back to domain 1 in response to the request signal and any data related thereto. Domain 2 is operating at a clock speed faster than domain 1. Flip-flop circuits 50 and 55 are clocked by the clock line 14 of domain 1 and are configured as a double synchronizer circuit 64 for capturing the acknowledge signal from domain 2. Flip-flop circuits 60 and 70 are clocked by line 40 of domain 2 and together, with OR gate 65 comprise a pulse stretcher circuit 62. OR gate 65 is coupled between flip-flip 70 and flip-flop 60 using line 74. The acknowledge signal is input over line 72 and is pulse stretched using the pulse stretcher circuit 62. In one example case, the clock rate of domain 2 is 33 MHz having a pulse width of 30 ns while domain 1 is clocked at 20 MHz having a pulse width of 50 ns. Therefore, the pulse stretcher circuit 62 acts to stretch the 30 ns acknowledge pulse to 60 ns which is within the proper timing period to be captured by domain 1 (having a 50 ns window).

The disadvantages of the interface circuitry of FIG. 1A and FIG. 1B are two fold. The double synchronization circuits 45 and 64 consume too much cycle time and thereby add unwanted performance degradation to the overall communication system. It would be advantageous to eliminate this signal delay. Secondly, the pulse stretcher circuit 62 is hardwired for a particular ratio of clock speeds between the two clock domains (e.g., 20 MHz and 33 MHz) and is therefore static and based on these clock rate ratios. This design is not particularly flexible for operating with domains of different clock rates. For instance, if domain 1 should be clocked at faster rate than domain 2, the design of FIG. 1B will fail or if the clock rate of domain 2 should double, then the design of FIG. 1B will fail. There is only a narrow band of clock rate ratios that is supported by the prior art design of FIG. 1B. It would be advantageous to provide an interface circuit that was dynamic and could support multiple clock rate ratios.

Accordingly, the present invention provides an interface circuit for providing handshaking signals between subsystem domains having different clock rates within an electronic system. The present invention provides an interface circuit without the performance degradation associated with double synchronization circuits. The present invention also provides an interface circuit having a design that is not static but rather supports multiple clock rate ratios automatically. These and other advantages of the present invention not specifically mentioned above will become clear within discussions of the present invention presented herein.

SUMMARY OF THE INVENTION

A method and circuit are described herein for handshaking information across multiple clock domains within an electronic system. The environment of the present invention includes an electronic or computerized system having at least two subsystem domains (a first domain and a second domain) operating at different clock rates (a first clock and a second clock). The present invention includes a handshake circuit coupled between the first and second domains for providing the required handshaking signals to control the transfer of data between the first domain (master) to the second domain (slave). With respect to the transaction, the initiator is within the master domain and the other device is within the slave domain. In one exemplary case, the sender of information is within the master domain and the receiver of the information is within the slave domain. An information or message bus is coupled between the domains. The handshake circuit is such that double synchronization is not required and the design of the present invention is dynamic such that it is operable between clock domains having different frequency.

The present invention utilizes the asynchronous input of a flip-flop circuit to catch pertinent handshaking signals between clock domains. The D input and the clock input of the flip-flop circuit are coupled to the master clock domain and the master clock domain receives a ready signal back from the handshake circuit. When ready is asserted, the master domain may assert a request (from the master domain) over the D input and hold data over the message bus for transfer between the slave domain. The Q output of the flip-flop circuit is coupled to a request line (to the slave domain) which is also coupled as an input to a NOR circuit. The slave domain polls the request signal and may read data when this signal is asserted. The slave domain generates an acknowledge signal to the handshake circuit. The acknowledge signal is coupled to the asynchronous flip-flip input as a clear (or reset) and is also coupled to the second input of the NOR circuit. The output of the NOR circuit generates the ready signal to the master domain.

Specifically, embodiments of the present invention include a communication system comprising: a) a master domain having a master clock signal; b) a slave domain having a slave clock signal that is different in frequency than the master clock signal; c) a flip-flop circuit comprising: c1) an input coupled to receive a first request signal from the master domain indicating the commencement of a transaction; c2) a clock input coupled to the master clock signal; c3) an output coupled to provide a second request signal to the slave domain; and c4) an asynchronous input for receiving an acknowledge signal pulse from the slave domain and for resetting the output in response thereto; and d) a logic gate for asserting a ready signal to the master domain provided the acknowledge signal pulse from the slave domain and second request signal from the flip-flop circuit are both deasserted; and e) a message bus coupled between the master domain and the slave domain for transferring information.

Embodiments include the above and wherein, provided the ready signal is asserted, the master domain is for asserting the first request signal and simultaneously therewith for maintaining data over the message bus for transfer to the slave device and wherein the slave device is for reading the data from the message bus in response to the output of the flip-flop circuit and for asserting the acknowledge signal pulse thereafter. Embodiments include the above and wherein the logic gate is a NOR gate.

DETAILED DESCRIPTION OF THE INVENTION

In the following detailed description of the present invention, a handshake circuit for generating handshake signals for the transfer of information between multiple clock domains of an electronic system, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Figure 1A:
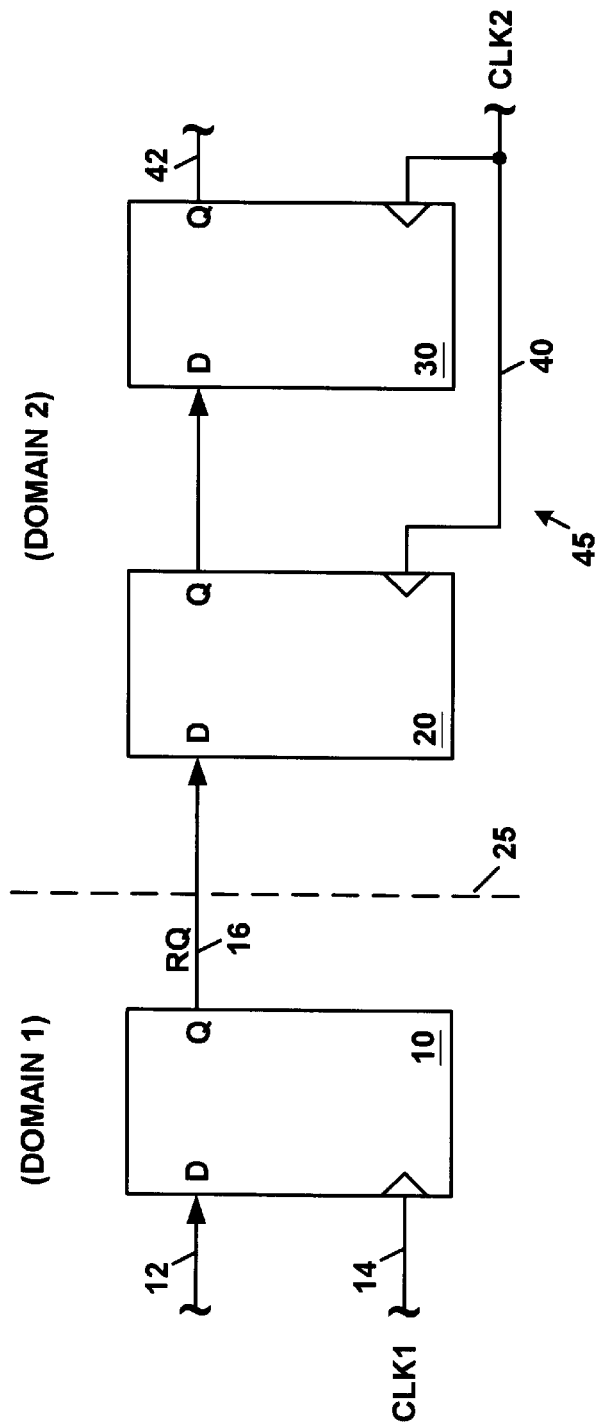
FIG. 1A is a circuit diagram of a prior art handshake circuit for communicating a request signal from a first clock domain system to a second clock domain system.
Figure 1B:
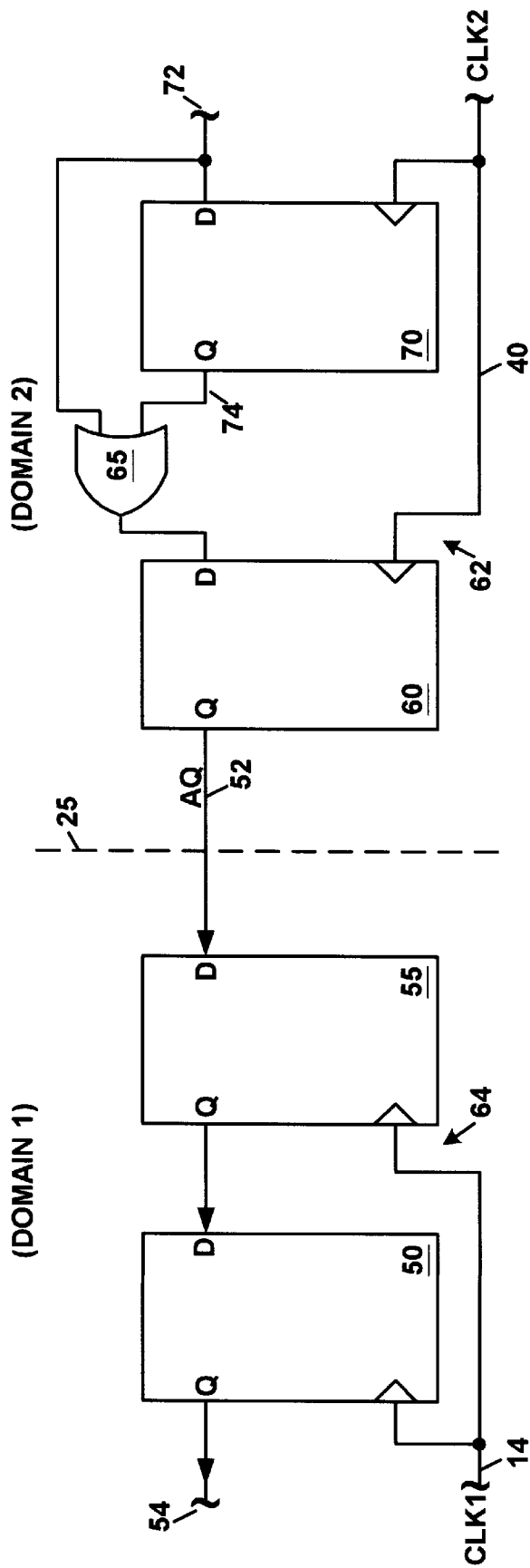
FIG. 1B is a circuit diagram of a prior art handshake circuit for communicating an acknowledge signal from the second clock domain system to the first clock domain system.
Figure 2:
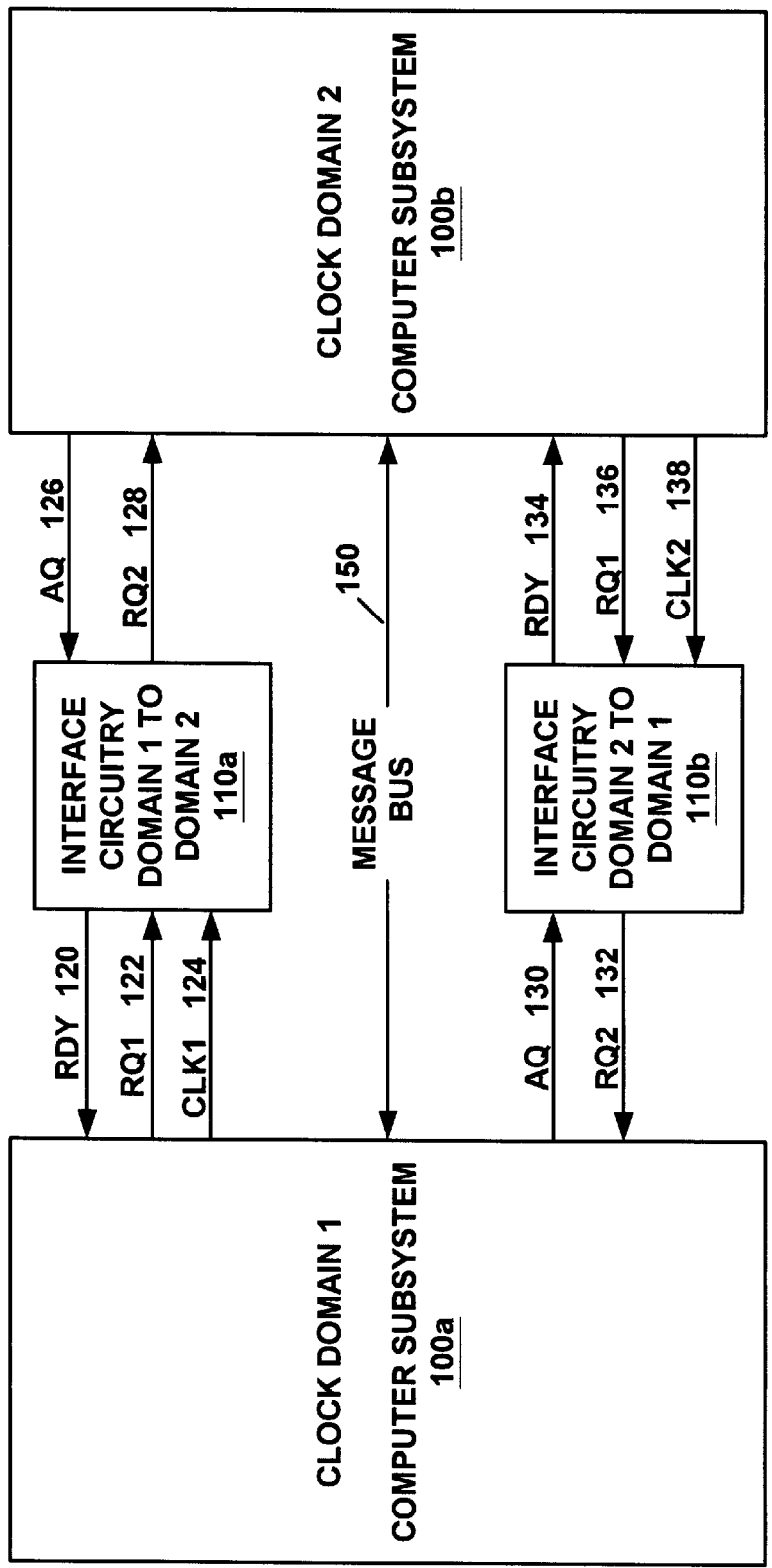
FIG. 2 illustrates an overall electronic system in which the handshake circuit of the present invention operates.

FIG. 2 illustrates an integrated circuit design 200 composed of at least two different computer subsystems 100*a* and 100*b*. Design 200 can represent a portion of an adapter, a router, a switch, or any hardware designed for transporting data across multiple clock domains. The subsystems 100*a* and 100*b* are coupled together using interface circuitry 110*a* and 110*b* of the present invention and also a message bus 150. Message bus 150 can be a generic information carrier and therefore can optionally include a multi-line data bus, a multi-line address bus and/or a control bus. Subsystem 100*a* is clocked by a first clock of a first frequency and is called "clock domain 1." Subsystem 100*b* is clocked by a second clock of a second frequency and is called "clock domain 2." Within the present invention, there is no restriction regarding the respective clock frequencies, their frequency ratios nor any restriction on whether the first clock frequency is faster, slower or equal to the second clock frequency. The present invention advantageously supports all clock frequency configurations.

Interface circuitry 110*a* of the present invention provides the required handshaking signals for performing a transaction of information initiated by clock domain 1 to or from clock domain 2. For example, the transaction can include sending information from domain 1 to domain 2. Interface circuitry 110b of the present invention provides the required handshaking signals for performing a transaction of information initiated by clock domain 2 to or from clock domain 1. For example, the transaction can include sending information from domain 2 to domain 1. Handshaking signals are used by one device in one clock domain to transfer data to another device in another clock domain. It is appreciated that while both interface circuits 110a and 110b are shown in system 200, system 200 does not require that both circuits be employed and therefore system 200 could, alternatively, have only interface circuit 110a or interface circuit 110b. Should only interface circuit 110a be employed, then communication is restricted such that only information transfers initiated by clock domain 1 to clock domain 2 are supported. Should only interface circuit 110b be employed, then communication is restricted such that only information transfers initiated by clock domain 2 to clock domain 1 are supported.

It is appreciated that either clock domain 1 or clock domain 2 can be the "master" domain. Also, either clock domain 1 or clock domain 2 can be the "slave" domain. Specifically, when clock domain 1 is initiating a transaction, e.g., communicating information to clock domain 2, then interface circuit 110a is being used and clock domain 1 is the "master" domain while clock domain 2 is the "slave" domain. Moreover, when clock domain 2 is initiating a transaction, e.g., communicating information to clock domain 1, then interface circuit 110b is being used and clock domain 2 is the "master" domain while clock domain 1 is the "slave" domain. In either case, during an information communication, the interface circuits 110a and 110b of the present invention provide the proper handshaking while the actual information is transferred over the message bus 150.

Although the present invention can operate equally well with a number of different computer bus architectures, an exemplary configuration is described herein. In one embodiment, either clock domain 1 or clock domain 2 supports the PCI bus standard while the other domain supports the AMBA Advanced Microcontroller Bus Architecture bus standard. The AMBA Advanced Microcontroller Bus Architecture bus standard includes both the low speed Advanced Peripheral Bus (APB) bus architecture and the high speed Advanced System Bus (ASB) bus architecture. The AMBA Advanced Microcontroller Bus Architecture bus architecture can be used to interface to an Advance RISC Machine (ARM) microprocessor. Although the present invention can operate at essentially any bus rate, or bus rate ratio, in one particular and exemplary embodiment, the PCI bus architecture operates at 33 MHz while the AMBA bus architecture operates at 20 MHz.

FIG. 2 illustrates the handshaking signals employed by the present invention. With respect to interface circuit 110a, it receives first request signals over line 122 (RQ1) from clock domain 1 and is clocked by the first clock (CLK1) over clock line 124. First request signals originate from clock domain 1 and indicate that clock domain 1 is ready to transfer information (via the message bus 150) to clock domain 2. The request signal typically commences a transaction. Clock domain 1 receives a ready signal (RDY) over line 120 from interface circuit 110a that, when asserted, indicates that interface circuit 110a is available to perform an information transfer.

Interface circuit 110a receives an acknowledge signal (AQ) over line 126 from clock domain 2 indicating that it received the information associated with an outstanding request. The acknowledge signal typically indicates that a transaction is completed. Clock domain 2 receives a second request signal (RQ2) over line 128 indicating that clock domain 1 is commencing an information transfer. The particular operation of these handshake signals with respect to an information transfer is described in more detail below. With respect to interface circuit 110a, clock domain 1 is the master and clock domain 2 is the slave. In accordance with the present invention, the first clock (CLK1) can be faster, slower or equal to the second clock (CLK2).

Similarly, with respect to FIG. 2, there are handshake signals associated with information transfers from clock domain 2 to clock domain 1. With respect to interface circuit 110b, it receives first request signals over line 136 (RQ1) from clock domain 2 and is clocked by the second clock (CLK2) over clock line 138. First request signals originate from clock domain 2 and indicate that clock domain 2 is ready to transfer information (via the message bus 150) to clock domain 1. Clock domain 2 receives a ready signal (RDY) over line 134 from interface circuit 110b that, when asserted, indicates that interface circuit 110b is available to perform an information transfer.

Interface circuit 110b receives an acknowledge signal (AQ) over line 130 from clock domain 1 indicating that it received the information associated with an outstanding request. Clock domain 1 receives a second request signal (RQ2) over line 132 indicating that clock domain 2 is commencing an information transfer. The particular operation of these handshake signals with respect to an information transfer is described in more detail below. With respect to interface circuit 110b, clock domain 2 is the master and clock domain 1 is the slave. In accordance with the present invention, the first clock (CLK1) can be faster, slower or equal to the second clock (CLK2).

Figure 3:
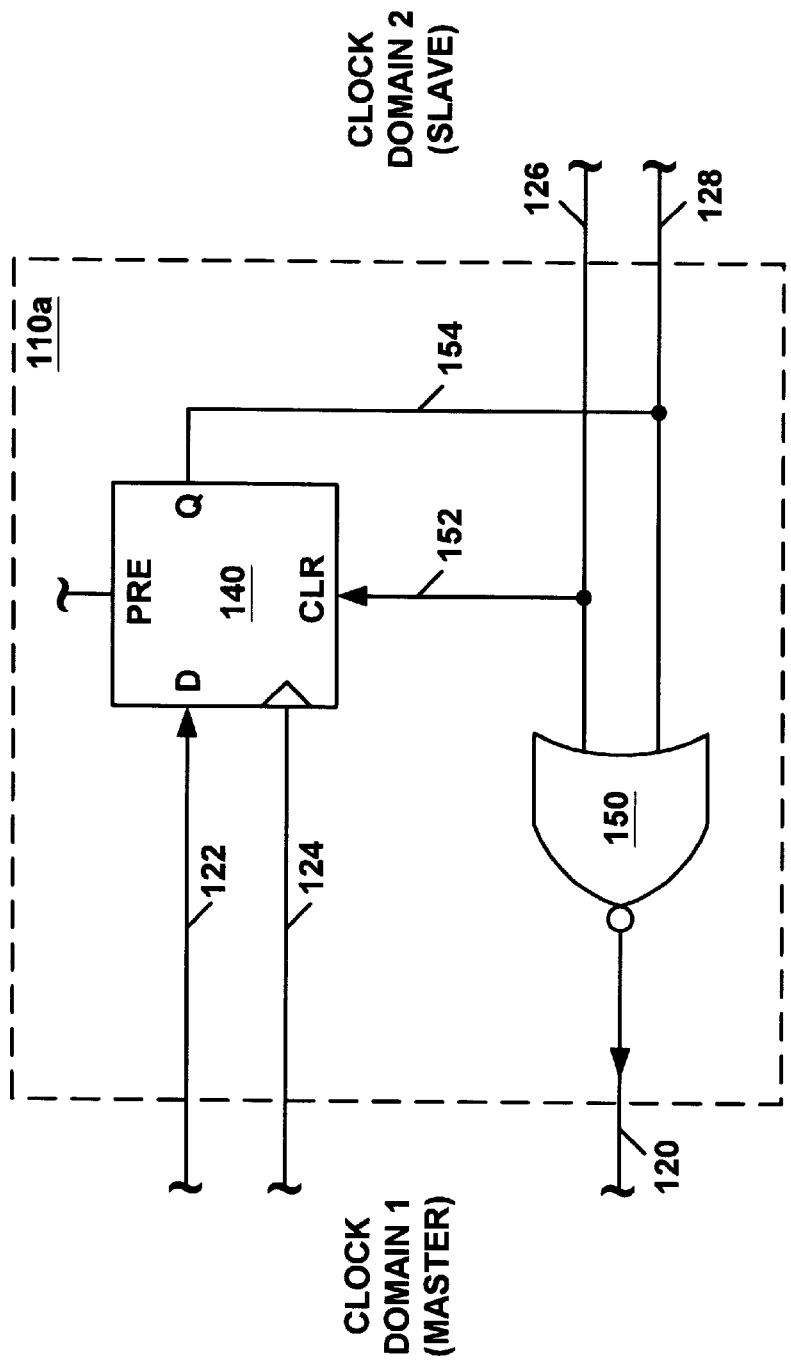
FIG. 3 illustrates an embodiment of the handshake circuit of the present invention used for generating handshake signals for the transfer of information between multiple clock domains.

FIG. 3 illustrates a circuit schematic of the interface circuit 110a of the present invention where clock domain 1 is the master and clock domain 2 is the slave. An analogous circuit can also be used to implement the interface circuit 110b (except with respect to circuit 110b, clock domain 1 is the slave and clock domain 2 is the master). Lines 122 and 120 of FIG. 3 are coupled to a sending device of master clock domain 1. A device is an electronic device and can be represented as any electronic entity such a processor, a random access memory, a first-in-first-out device, or any Application Specific Integrated Circuit (ASIC) internal module such as a state machine circuit or data interface circuit. Line 122 is the request line and receives first request signals from the sending device indicating that the sending device is ready to send information to a receiving device of clock domain 2. Line 124 is clocked by the first clock signal of clock domain 1. Line 120 carries the ready signal and when asserted, indicates to the sending device that interface 110a is ready to perform an information transfer. When deasserted, line 120 indicates to the sending device that interface circuit 110a is busy with a current or pending transaction.

Lines 126 and 128 interface with a receiving device of slave clock domain 2 of FIG. 3. Line 126 represents the acknowledge line and receives an acknowledge pulse from the receiving device when an information transfer is complete. Line 128 carries the second request signal to the receiving device to indicate that the sending device is commencing an information transfer. The request signal of line 128 is a "second" request signal because it is generated from the output of flip-flop 140 and is therefore not directly coupled to line 122.

Interface circuit 110a of FIG. 3 includes a sequential element, e.g., a D-flip-flop circuit 140. Interface circuit 110a also includes a NOR gate 150. Request line 122 is coupled to the data or "D" input of the flip-flop circuit 140. Clock line 124 is coupled to clock flip-flop circuit 140. The output, Q, of flip-flop circuit 140 is coupled to line 128 via line 154. Line 126 is coupled to the asynchronous clear or reset pin of flip-flop 140 via line 152. The inputs of NOR gate 150 are coupled to lines 126 and 128. The output of NOR gate 150 is the ready signal as carried over line 120.

In accordance with the present invention, assuming the ready signal is asserted, when the sending device has data that is ready to be transferred, it asserts a first request signal over line 122 that indicates to the receiving device that a transaction is to commence. The receiving device receives this request from a second request signal from line 128. After processing the request, the receiving device asserts an acknowledge signal (pulse) to indicate to the sending device that the data transaction is finished. The acknowledge signal clears the flip-flop 140 by the asynchronous pin on the acknowledge path. When the ready signal is asserted, then interface circuit 110a indicates that it is not requesting and it is not being acknowledged, so the interface circuit 110a is free to process another transaction.

Interface circuit 110a generates the ready signal over line 120 only when the second request signal is not asserted in conjunction with the acknowledge signal being deasserted. Otherwise, the ready signal over line 120 indicates that interface circuit 110a is busy. The ready signal, when asserted, indicates that no data transaction is pending or taking place.

It is appreciated that the present invention takes advantage of the asynchronous reset of the flip-flop circuit 140 to allow the clocks between the sending and receiving devices to be different. Particularly, the present invention couples the acknowledge signal line 126 to the asynchronous reset of the flip-flop circuit 140 to achieve this functionality. The acknowledge pulse over line 126 is effective to reset the output of flip-flop 140 thereby deasserting line 128. This effectively asserts the ready signal over line 120. By taking advantage of the asynchronous reset of the flip-flop 140 as shown in FIG. 3, the interface circuit 110a of the present invention eliminates any need for pulse stretcher circuits or for double synchronization circuit as required of the prior art described herein. By eliminating these prior art circuits and employing the design of FIG. 3, the present invention provides a dynamic interface circuit for handshaking in that it is operable within any ratio of clocks and is not fixed to any particular clock ratio or narrow band of clock ratios.

It is appreciated further that generating the ready signal using a NOR gate is but one example of the present invention. In accordance with the present invention, a ready signal can be generated from a request and an acknowledge signal. The particular implementation of FIG. 3 achieves a ready signal that is asserted only when the request and acknowledge signals are both deasserted, meaning no transaction is pending or currently taking place.

Figure 4:
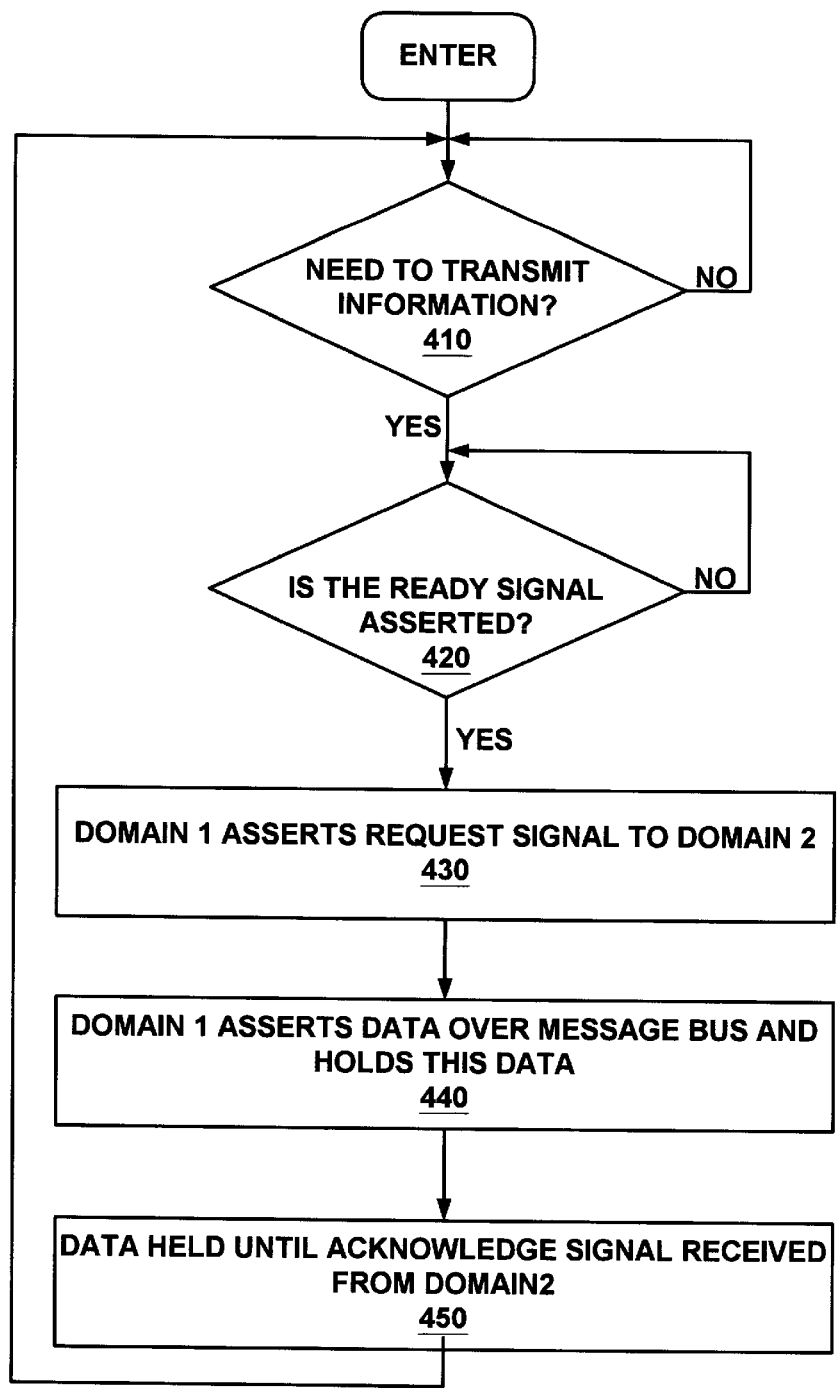
FIG. 4 is a flow diagram illustrating steps performed by the handshake circuit of the present invention during normal operation.

FIG. 4 illustrates an exemplary flow diagram of the steps of a process 400 used by the sending device and the receiving device to transfer information from domain 1 to domain 2 but could be adapted to represent a transaction between any master and any slave. It is appreciated that the information to be transferred could represent any information, including data, control information, address information, etc. At step 410, the sending device of clock domain 1 checks if it requires an information transfer. If not, step 410 is re-entered. If an information transfer is required, then step 420 is entered. At step 420 the sending device checks if its ready signal (e.g., over line 120) is asserted. If the ready signal is not asserted, then the interface circuit (e.g., circuit 110a) is busy with another pending or current information transfer and step 420 is re-entered. If the ready signal is asserted, then the interface circuit is not busy and step 430 is entered.

At step 430 of FIG. 4, the sending device of clock domain 1 asserts a first request signal over line 122 to the interface circuit and at step 440 asserts and holds the information to be transferred over the message bus 150. It is appreciated that step 430 and step 440 can occur simultaneously. The interface circuit 110a then asserts a second request signal over line 128 to indicate to the receiving device of clock domain 2 that an information transfer is commencing. At step 450, the information of the message bus 150 is held until the receiving device generates an acknowledge pulse over line 126 indicating that the receiving device completed the information transfer. The acknowledge pulse resets the second request signal and when line 126 becomes deasserted, the ready signal over line 120 becomes asserted. Step 410 is then entered for any other information transfer.

Figure 5:
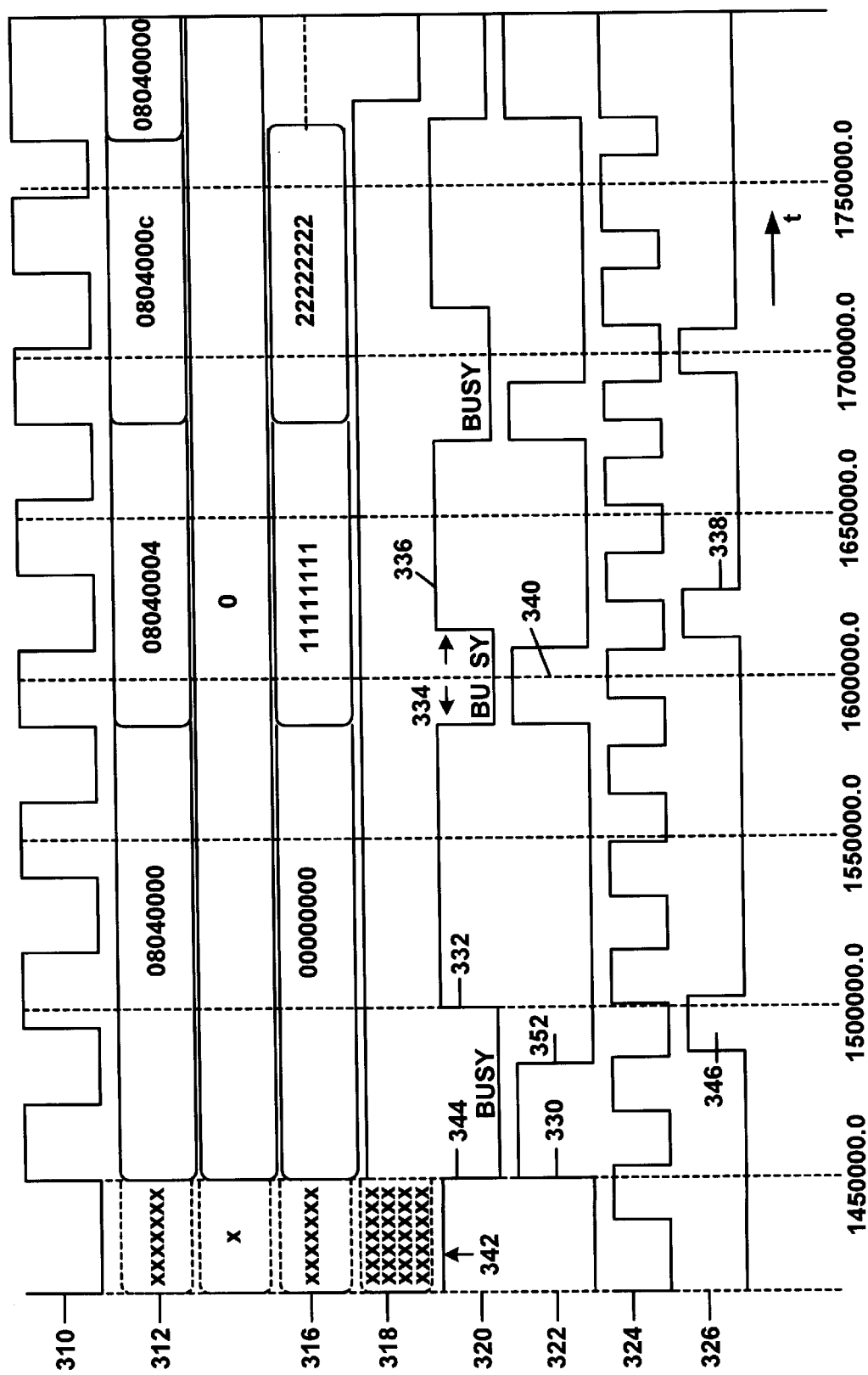
FIG. 5 is a timing diagram illustrating pertinent signals generated and received by the handshake circuit of the present invention for a typical transaction.

FIG. 5 illustrates timing diagrams of an exemplary information transaction from a sending device to a receiving device where the sending device. Exemplary clock rates of 33 MHz and 20 MHz are used as clock "A" and clock "B," respectively. Data transfers take place between two domains having these clock rates. In this example, the receiving device is a memory (e.g., RAM) interface. Clock B is shown as timing signal 310 and clock A is shown as timing signal 324. The message bus 150 includes an address bus and a data bus in this example. The address signals are shown as 312 and the data signals are shown as 316.

The first request signal timing is shown as 322. The sending device monitors its ready line (shown as 320), and waits for the ready line to be asserted (e.g., point 342). When the ready line 320 is asserted, a request can be made by the sending device. A particular first request signal is shown as 330 (going high). In conjunction with request 330, signal 318 indicates a write cycle (but alternatively could indicate a read cycle). The request 330 immediately takes the ready line low as shown by 344 to indicate that a transaction is pending.

Information over the message bus (e.g., data 316 and/or address information 312) is then processed by the receiving device. After the receiving device processes the request, it generates an acknowledge pulse 346 over the acknowledge line shown as signal timing 326 of FIG. 5. The start of the acknowledge pulse causes the request signal to become deasserted at 352 and the end of the acknowledge pulse causes the ready signal to become asserted at 332, thereby making the interface circuit ready for the next transaction. The acknowledge signal in this example is a 15 ns pulse. Thus the present invention allows handshaking between two different clock domains, in this case a 15 ns pulse in a 30 ns period (33 MHz) domain signaling to a device running in the 50 ns period (20 MHz) clock domain.

The preferred embodiment of the present invention, a handshake circuit for generating handshake signals for the transfer of information between multiple clock domains of an electronic system, is described. While the present invention has been described in particular embodiments, it should be appreciated that the present invention should not be construed as limited by such embodiments, but rather construed according to the below claims.

What is claimed is:

1. A handshake circuit for facilitating communication between a master domain and a slave domain, said handshake circuit comprising:

a) a flip-flop circuit comprising:
- a1) an input coupled to receive a first request signal from said master domain, said first request signal indicating a transaction commencement;
- a2) a clock input coupled to a clock signal of said master domain;
- a3) an output coupled to provide a second request signal to said slave domain, said slave domain having a clock signal different in frequency from said clock signal of said master domain; and
- a4) an asynchronous input for receiving an acknowledge signal from said slave domain and for resetting said output in response thereto, said acknowledge signal indicating a transaction completion; and b) a logic gate for asserting a ready signal to said master domain provided said acknowledge signal from said slave domain and second request signal from said flip-flop circuit are both deasserted; and wherein said communication between said master domain and said slave domain is dynamic, such that said communication is facilitated irrespective to said clock frequencies of said master domain and said slave domain.

2. A handshake circuit as described in claim 1 wherein said logic gate is a NOR gate and wherein said acknowledge signal is a pulse.

3. A handshake circuit as described in claim 1 wherein said master domain generates said first request signal only if said ready signal is asserted.

4. A handshake circuit as described in claim 1 wherein said master domain is compliant with the Peripheral Components Interconnect (PCI) standard and said slave domain is compliant with the Advanced Microcontroller Bus Architecture (AMBA) standard.

5. A handshake circuit as described in claim 1 wherein said slave domain is compliant with the Peripheral Components Interconnect (PCI) standard and said master domain is compliant with the Advanced Microcontroller Bus Architecture (AMBA) standard.

6. A handshake circuit as described in claim 1 wherein said clock signal of said master domain is faster in frequency than said clock signal of said slave domain.

7. A handshake circuit as described in claim 1 wherein said clock signal of said master domain is slower in frequency than said clock signal of said slave domain.

8. A communication system comprising:
a) a master domain having a master clock signal;
b) a slave domain having a slave clock signal that is different in frequency than said master clock signal;
c) a flip-flop circuit comprising:
- c1) an input coupled to receive a first request signal from said master domain, said first request signal indicating a transaction commencement;
- c2) a clock input coupled to said master clock signal;
- c3) an output coupled to provide a second request signal to said slave domain; and
- c4) an asynchronous input for receiving an acknowledge signal pulse from said slave domain and for resetting said output in response thereto, said acknowledge signal indicating a transaction completion; and d) a logic gate for asserting a ready signal to said master domain provided said acknowledge signal pulse from said slave domain and second request signal from said flip-flop circuit are both deasserted; and
e) a message bus coupled between said master domain and said slave domain; and wherein said commenced transaction within said communication system between said master domain and said slave domain is dynamic, such that said transaction is commenced irrespective to said clock frequencies of said master domain and said slave domain.

9. A communication system as described in claim 8 wherein, provided said ready signal is asserted, said master domain is for asserting said first request signal and simultaneously therewith for maintaining data over said message bus for transfer to said slave domain.

10. A communication system as described in claim 9 wherein said slave device is for reading said data from said message bus in response to said output of said flip-flop circuit and for asserting said acknowledge signal pulse thereafter.

11. A communication system as described in claim 8 wherein said logic gate is a NOR gate.

12. A communication system as described in claim 8 wherein said master domain is compliant with the Peripheral Components Interconnect (PCI) standard and the slave domain is compliant with the Advanced Microcontroller Bus Architecture (AMBA) standard.

13. A communication system as described in claim 8 wherein said slave domain is compliant with the Peripheral Components Interconnect (PCI) standard and the master domain is compliant with the Advanced Microcontroller Bus Architecture (AMBA) standard.

14. A communication system as described in claim 8 wherein said master clock signal is faster in frequency than said slave clock signal.

15. A communication system as described in claim 8 wherein said master clock signal is slower in frequency than said slave clock signal.

16. A method of communicating information between a master domain having a master clock signal and a slave domain having a slave clock signal that is different in frequency than said master clock signal, said method comprising the steps of:
a) said master domain, provided a ready signal is asserted, generating a first request signal to an input of a flip-flop circuit and maintaining data over a message bus wherein said message bus is coupled between said master and slave domains;
b) said flip-flop circuit generating a second request signal to said slave domain that deasserts said ready signal, said flip-flop circuit clocked by said master clock;
c) responsive to said second request signal, said slave domain processing a transaction involving said data from said message bus and generating an acknowledge signal pulse, said acknowledge signal pulse coupled to an asynchronous reset of said flip-flop circuit; and
d) said acknowledge signal pulse resetting said output of said flip-flop circuit and also asserting said ready signal; and wherein said communication between said master domain and said slave domain is dynamic, such that said communication is commenced irrespective to said clock frequencies of said master domain and said slave domain.

17. A method as described in claim 16 wherein said step d) is performed by a NOR gate generating said ready signal as an output signal and receiving as inputs said second request signal and said acknowledge signal pulse.

18. A method as described in claim 16 wherein master domain is compliant with the Peripheral Components Interconnect (PCI) standard and the slave domain is compliant with the Advanced Microcontroller Bus Architecture (AMBA) standard.

19. A method as described in claim 16 wherein said master clock signal is faster in frequency than said slave clock signal.

20. A method as described in claim 16 wherein said master clock signal is slower in frequency than said slave clock signal.

* * * * *